United States Patent
Mbaye et al.

(10) Patent No.: US 12,264,768 B2
(45) Date of Patent: Apr. 1, 2025

(54) FLUIDIC CONNECTOR PROVIDED WITH A PRESSURE SENSOR

(71) Applicant: A. RAYMOND ET CIE, Grenoble (FR)

(72) Inventors: Mansour Mbaye, Moirans (FR); Emile Ferrand, Echirolles (FR)

(73) Assignee: A. Raymond et Cie, Grenoble (FR)

( * ) Notice: Subject to any disclaimer, the term of this patent is extended or adjusted under 35 U.S.C. 154(b) by 260 days.

(21) Appl. No.: 17/995,653

(22) PCT Filed: Mar. 26, 2021

(86) PCT No.: PCT/FR2021/050542
§ 371 (c)(1),
(2) Date: Oct. 6, 2022

(87) PCT Pub. No.: WO2021/205093
PCT Pub. Date: Oct. 14, 2021

(65) Prior Publication Data
US 2023/0160514 A1    May 25, 2023

(30) Foreign Application Priority Data
Apr. 6, 2020  (FR) ...................................... 2003418

(51) Int. Cl.
*F16L 41/00*   (2006.01)
*F16L 33/30*   (2006.01)
*G01L 19/00*   (2006.01)

(52) U.S. Cl.
CPC ............. *F16L 41/008* (2013.01); *F16L 33/30* (2013.01); *G01L 19/0038* (2013.01)

(58) Field of Classification Search
None
See application file for complete search history.

(56) References Cited

U.S. PATENT DOCUMENTS

2012/0285571 A1 *  11/2012  Kurth .................... F16L 41/008
                                                      138/104
2020/0018433 A1 *  1/2020  Zwillus ................... F16L 41/02

FOREIGN PATENT DOCUMENTS

CN    205877527    *  1/2017
CN    109716008 A    5/2019
(Continued)

OTHER PUBLICATIONS

Chinese Office Action and Search Report for Application No. 202110366240.3 dated May 21, 2024, 14 pages.
(Continued)

*Primary Examiner* — Suman K Nath
*Assistant Examiner* — Nigel H Plumb
(74) *Attorney, Agent, or Firm* — TraskBritt (57) ABSTRACT

A fluid connector comprises a body, an assembly interface arranged on and in the body, a pressure sensor, a cover, and a resilient element positioned between the cover and one face of the pressure sensor. The body has two fluid connection end pieces and an internal duct. The assembly interface comprises an orifice placing the internal duct in communication with the outside of the body, a first receiving area extending around the orifice, a second receiving area extending around the first receiving area, and attachment regions. The pressure sensor is in contact with the first receiving area via a first gasket. The cover is positioned on the pressure sensor and is in contact with the second receiving area via a second gasket to isolate the pressure sensor from the outside environment. The cover comprises side wings configured to cooperate with the attachment regions.

19 Claims, 7 Drawing Sheets

(56) References Cited

FOREIGN PATENT DOCUMENTS

| | | |
|---|---|---|
| CN | 209781960 | 12/2019 |
| CN | 209927349 | 1/2020 |
| CN | 214889572 | 11/2021 |
| EP | 1967782 | 11/2011 |

OTHER PUBLICATIONS

International Search Report for International Application No. PCT/FR2021/050542 dated Jun. 23, 2021, 3 pages.
International Written Opinion for International Application No. PCT/FR2021/050542 dated Jun. 23, 2021, 7 pages.

* cited by examiner

FLUIDIC CONNECTOR PROVIDED WITH A PRESSURE SENSOR

CROSS-REFERENCE TO RELATED APPLICATIONS

This application is a national phase entry under 35 U.S.C. § 371 of International Patent Application PCT/FR2021/050542, filed Mar. 26, 2021, designating the United States of America and published as International Patent Publication WO 2021/205093 A1 on Oct. 14, 2021, which claims the benefit under Article 8 of the Patent Cooperation Treaty to French Patent Application Serial No. 2003418, filed Apr. 6, 2020.

TECHNICAL FIELD

This disclosure relates to the field of fittings and connectors to allow fluid communication between pipes or ducts, notably for motor vehicles. It relates to, in particular, a fluid connector equipped with a sensor for measuring the properties of the fluid circulating in the internal duct of the connector, for example, pressure.

BACKGROUND

Automotive fluid connectors are widely used to connect flexible hoses to rigid tubes on various fluid lines of a vehicle. Such connectors are used, in particular, on the liquid or vapor fluid lines that comprise the fuel system.

Developments in the diagnostics and functional check of modern vehicle engines increase the need for monitoring operating conditions in the fuel system, in particular, monitoring fluid pressure. It is therefore desirable to have fluid connectors provided with sensitive and robust pressure sensors, compatible with this environment.

European Union Patent Application Publication EP1967782 is known, which proposes a quick connector for fluids integrating a chamber on its external cylindrical wall to house a pressure sensor. The sensor communicates with the internal duct of the connector. The chamber is closed by a cover. A drawback of this approach is that forming the chamber, which requires raising partitions above the outer wall of the connector, significantly increases the bulk of the fluid connector. In addition, since the electrical connector is overmolded with the duct, this approach does not confer any modularity to the fluid connector.

U.S. Patent Application Publication US2012/285571 is also known, which describes a quick connector for fluids provided with a sensor, for example, a pressure sensor. The connector comprises a body in which a fluid circulates, a support base disposed on this body, and an attachment element bonded to the support base. The compactness and robustness of this type of connector still need to be improved.

BRIEF SUMMARY

The present disclosure provides an alternative solution to those of the prior art that seeks to remedy all or part of the aforementioned drawbacks. The present disclosure relates to, in particular, a compact, robust, modular fluid connector provided with a pressure sensor.

The present disclosure relates to a fluid connector comprising:
a body of generally cylindrical shape, having two fluid connection end pieces and defining an internal duct in which a fluid is intended to circulate,
an assembly interface arranged on and in the body, comprising an orifice placing the internal duct in communication with the outside of the body, a first receiving area extending around the orifice, a second receiving area extending around the first receiving area, and attachment regions,
a pressure sensor comprising a connecting cylinder arranged in or opposite the orifice, the pressure sensor establishing contact with the first receiving area via a first gasket to provide a seal between the internal duct and the outside of the body, and
a cover arranged on the pressure sensor and establishing contact with the second receiving zone via a second gasket to isolate the pressure sensor from the external environment, the cover further comprising an electrical connection end piece for connecting the pressure sensor, and two side wings extending at least in part around the body to cooperate with the attachment regions and to allow the cover to be assembled on the body, the two side wings being configured so that the cover overlaps the body.

According to other advantageous and non-limiting features of the present disclosure, taken alone or in any technically feasible combination:
the first receiving area comprises a housing coaxial with the orifice and the connecting cylinder forms a protuberance extending into the housing, the first gasket being placed in the housing and around the protuberance in order to provide a radial seal between the internal duct and the outside of the body;
the first receiving area comprises a conical widening in continuity with the orifice and the pressure sensor has a shoulder, the first gasket being placed in the conical widening and against the shoulder to provide a seal between the internal duct and the outside of the body;
the pressure sensor has a shoulder, the first gasket being placed against the shoulder and compressed by the pressure sensor to provide an axial seal between the internal duct and the outside of the body;
at least one of the fluid connection end pieces is a quick connector end piece;
the pressure sensor connecting cylinder forms a protuberance that extends into the orifice, flush with the internal duct or projecting substantially therein;
the first and/or the second gasket have/has an annular shape configured to reduce the compressive forces during assembly of the cover on the body;
the annular shape of the gasket has a cross section with a thinner central portion;
the two side wings are clipped, bonded or welded to the attachment regions;
each side wing has at least one tooth at its end and each attachment region has at least one groove to allow clipping of one to the other;
the tooth of each side wing has a progressive profile and/or each side wing has an edge inclined at its end, in order to allow progressive clipping of the cover on the body;
the second gasket comprises a strip of adhesive material when the two side wings are bonded to the attachment regions, or a weld bead when the two side wings are welded to the attachment regions;
the cover and the assembly interface have a shape that is symmetrical with respect to a longitudinal plane passing through a central axis of the internal duct and through a center of the orifice;

the body has a region with a narrowing diameter at one of the fluid connection end pieces, and the cover comprises a transverse wing resting on the narrowing region;

the pressure sensor comprises electrical connection terminals connected to pins leading into the electrical connection end piece;

the pins are overmolded or force-fitted in the cover;

the connection between the electrical connection terminals and the pins is provided by spring contacts;

the electrical connection terminals are soldered to the pins;

the fluid connector comprises a resilient element arranged between the cover and one face of the pressure sensor, the other face of the pressure sensor being in contact with the body to ensure the mechanical retention of the sensor between the cover and the body;

the fluid connector comprises a resilient element arranged between one face of the pressure sensor and the body, the other face of the sensor being in contact with the cover to ensure the mechanical retention of the sensor between the cover and the body;

the resilient element is made as a spring or of an elastomeric material;

the resilient element is overmolded on the cover or on the body, or fitted against the cover or against the body;

the assembly interface comprises centering pins for positioning the pressure sensor and/or the cover on the body; and the pressure sensor is secured to the cover or to the body.

BRIEF DESCRIPTION OF THE DRAWINGS

Further features and advantages of the present disclosure will become apparent from the following detailed description of example embodiments of the present disclosure, with reference to the accompanying figures, wherein.

DETAILED DESCRIPTION

In the descriptive part, the same references in the figures may be used for the same type of elements.

Figure 1A:
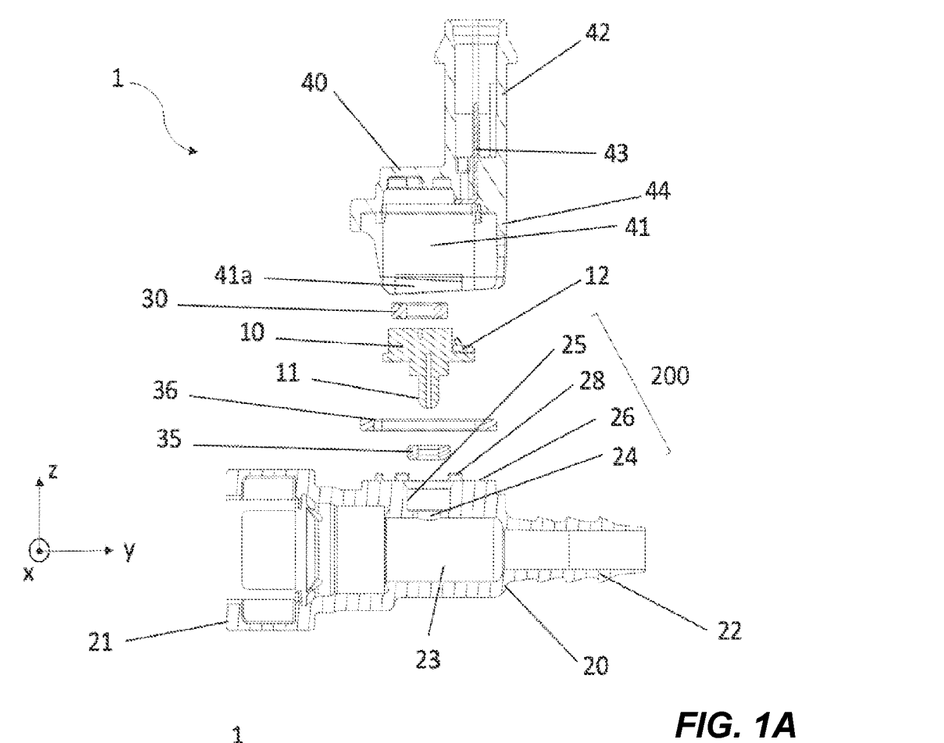
FIGS. 1A-1E show a fluid connector provided with a pressure sensor, according to a first embodiment of this present disclosure, respectively, in exploded view (FIG. 1A), in cross section according to a longitudinal plane (y,z) (FIG. 1B), in cross section along a transverse plane (x,z) (FIG. 1C), in side view (FIG. 1D), and in top view (FIG. 1E)
Figure 1B:
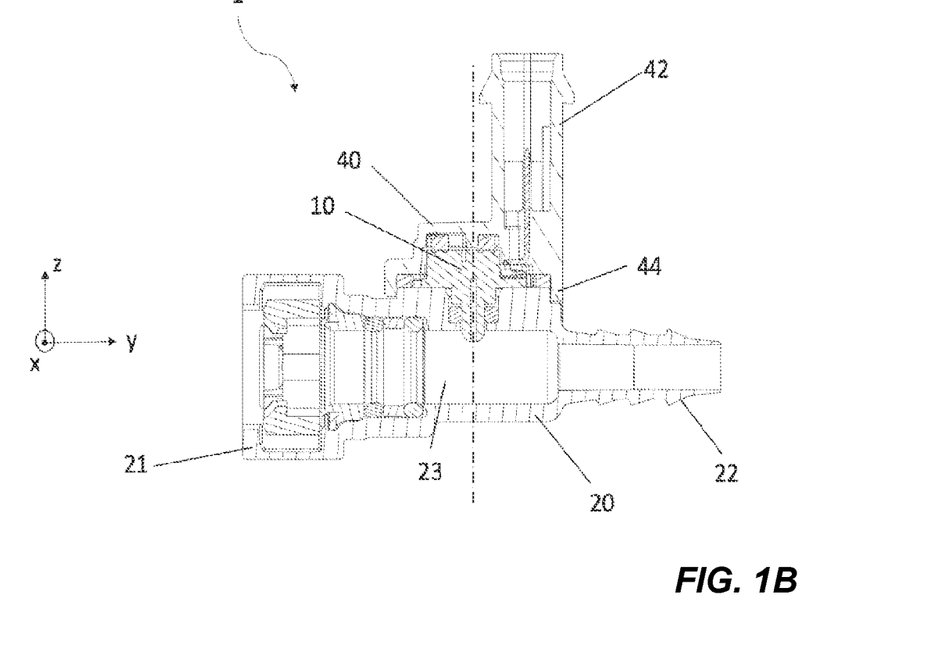

The present disclosure relates to a fluid connector 1 provided with a pressure sensor 10, an example of which is illustrated in FIG. 1A, in exploded view, and in FIG. 1B, in assembled configuration.

The fluid connector 1 comprises a body 20 of generally cylindrical shape and having two fluid connection end pieces 21, 22. In the example shown, one of the fluid connection end pieces is a quick connection end piece 21, as is known in the state of the art. In general, the present disclosure applies to any type of end piece.

The generally cylindrical body 20 defines an internal duct 23 in which a fluid is intended to circulate.

The fluid connector 1 also comprises an assembly interface 200 arranged on and in the body 20. More particularly, the assembly interface 200 forms part of the wall of the body 20 and corresponds to fittings made on and in this wall.

The assembly interface 200 comprises an orifice 24 passing through the wall of the body 20 and placing the internal duct 23 in communication with the outside of the body 20. It also comprises a first receiving area 25 extending around the orifice 24 and a second receiving area 26 extending around the first receiving area 25. These receiving areas 25, 26 define flat or inclined annular surfaces, preferably concentric, as will be apparent during the description of various embodiments. These are so named because they respectively provide a location to receive a first 35 and a second 36 gasket. In addition, the first receiving area 25 provides a point of contact, via the first gasket 35, with another element (the pressure sensor 10) of the connector 1, this contact providing a sealed connection between the element and the body 20; and the second receiving area 26 provides a point of contact, via the second gasket 36, with another element (a cover 40) of the connector 1, this contact providing a sealed connection between the element and the body 20.

Figure 1C:
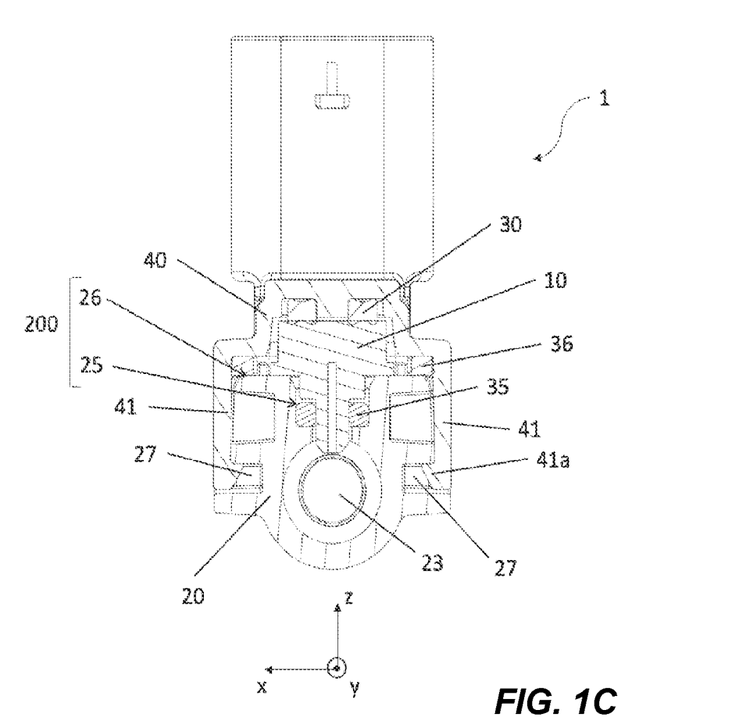

Lastly, the assembly interface 200 comprises attachment regions 27. As illustrated in FIG. 1C, these attachment regions 27 are located around the periphery of the body 20, on either side of the second receiving area 26.

The fluid connector 1 also comprises the pressure sensor 10 mentioned above. This sensor 10 comprises a connecting cylinder 11, which makes it possible to bring the fluid to a pressure measuring cell. The connecting cylinder 11 is placed in or opposite the orifice 24. Advantageously, the connecting cylinder forms a protuberance, which extends into the orifice 24, flush with the internal duct 23 or projecting substantially into the latter. Alternatively, the connecting cylinder 11 may only comprise an opening placing the fluid and the pressure measuring cell in communication.

The pressure sensor 10 also comprises a printed circuit, for example, of the PCB (printed circuit board) type, supporting the electronics and the electrical connection terminals 12 of the sensor 10.

The pressure sensor 10 establishes contact with the first receiving area 25 via the first gasket 35, to provide a seal between the internal duct 23 and the outside of the body 20. The first gasket 35 may have various shapes to adapt to the first receiving area 25; preferably, it is made of an elastomeric material. Alternatively, the gasket 35 may be made as a strip of adhesive: in this case, the pressure sensor 10 becomes integral with the body 20.

According to a first embodiment, shown in FIGS. 1A-1E, the first receiving area 25 comprises a housing, coaxial to the orifice 24, with the connecting cylinder 11 forming a protuberance extending into the housing. The first gasket 35 is placed in the housing and around the protuberance to provide a radial seal between the internal duct 23 and the outside of the body 20. The seal is provided by the radial compression of the gasket 35 against the plane and vertical surfaces (that is to say, parallel or tangent to the plane (y,z) in the figures) of the housing of the first receiving area 25 and of the protuberance of the connecting cylinder 11, respectively.

Figure 2A:
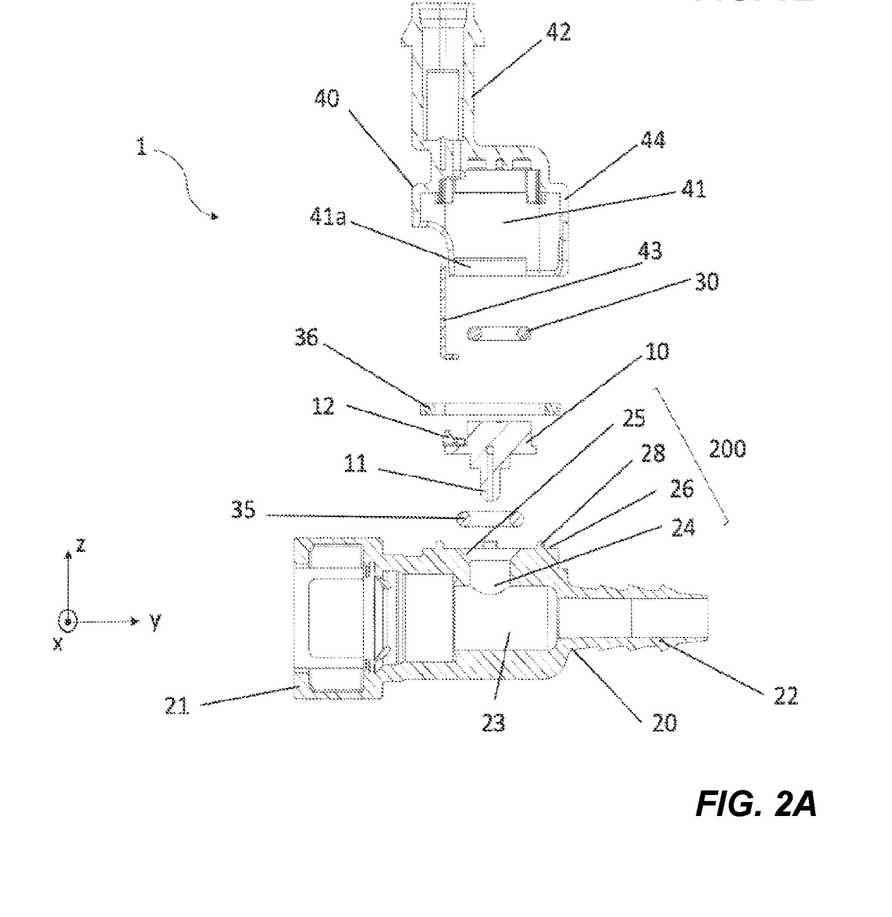
FIGS. 2A-2C show a fluid connector provided with a pressure sensor, according to a second embodiment of this present disclosure, respectively, in exploded view (FIG. 2A), in cross section along a longitudinal plane (y,z) (FIG. 2B), and in cross section along a transverse plane (x,z) (FIG. 2C)
Figure 2B:
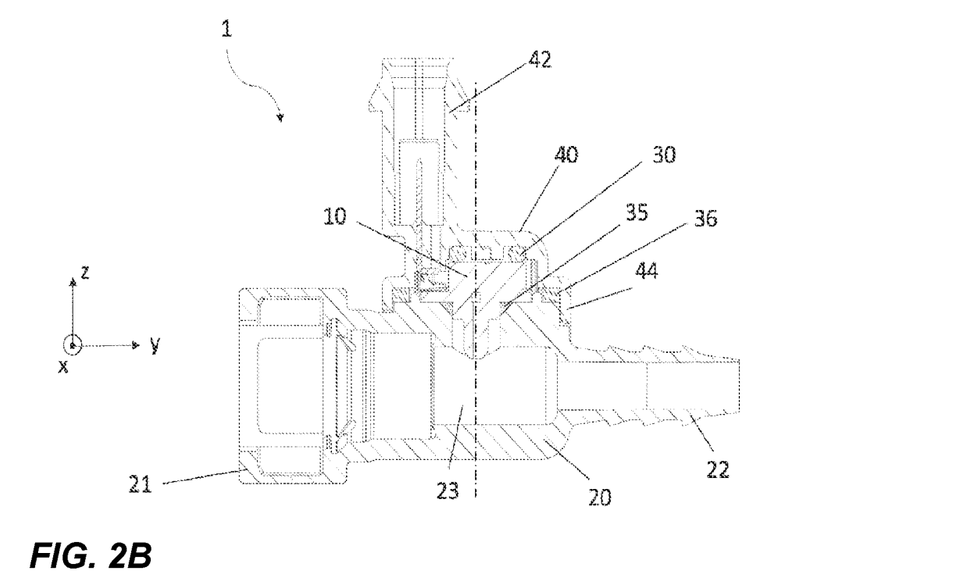
Figure 2C:
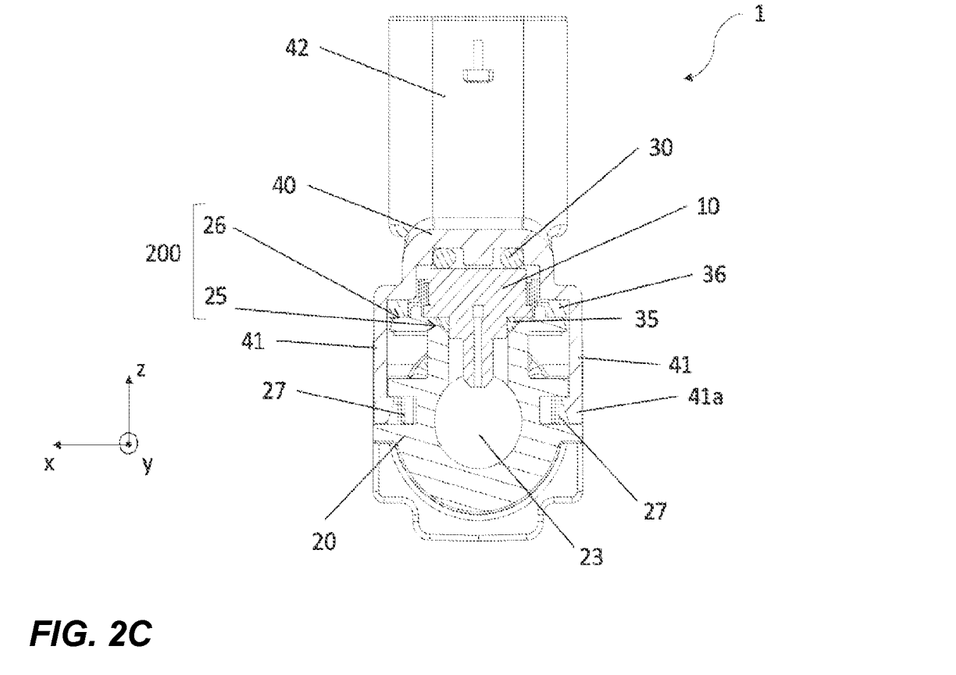

According to a second embodiment, shown in FIGS. 2A-2C, the first receiving area 25 comprises a conical widening in continuity with the orifice 24. The pressure sensor 10 has a shoulder, the first gasket 35 being placed within the conical widening and against the shoulder to provide the seal between the internal duct 23 and the outside of the body 20. Here, the seal is provided by the axial and radial compression of the gasket 35 against the inclined surface of the widening of the first receiving area 25 and against the wedge formed by the shoulder of the sensor 10.

Figure 3A:
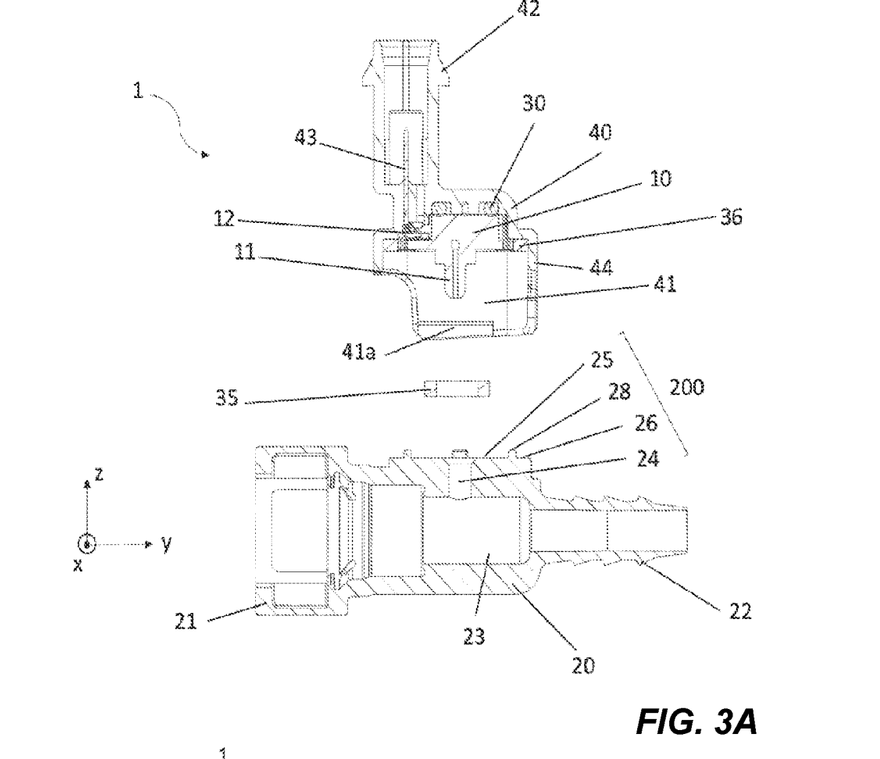
FIGS. 3A-3C show a fluid connector provided with a pressure sensor, according to a third embodiment of this present disclosure, respectively, in exploded view (FIG. 3A), in cross section along a longitudinal plane (y,z) (FIG. 3B), and in cross section along a transverse plane (x,z) (FIG. 3C)
Figure 3B:
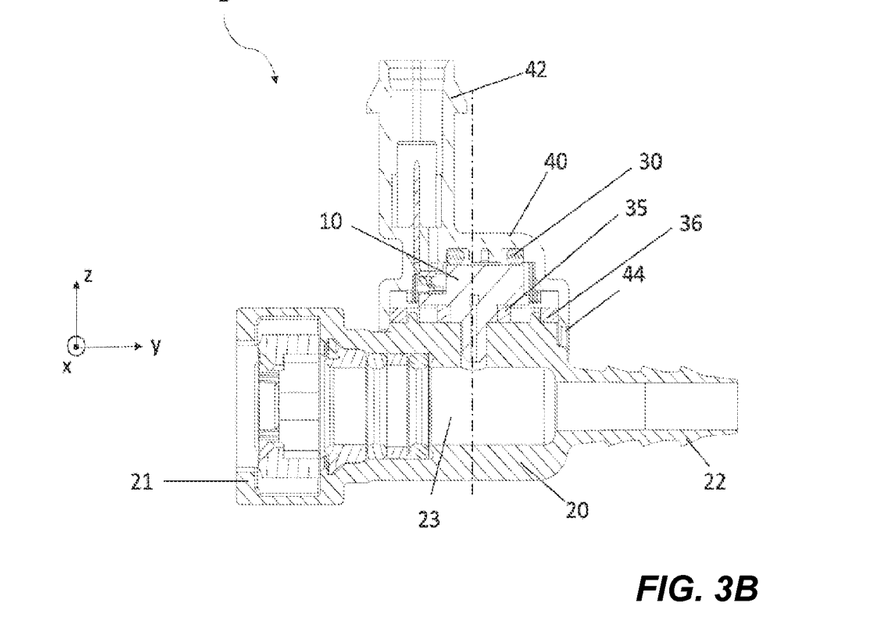
Figures 3C, 4A:
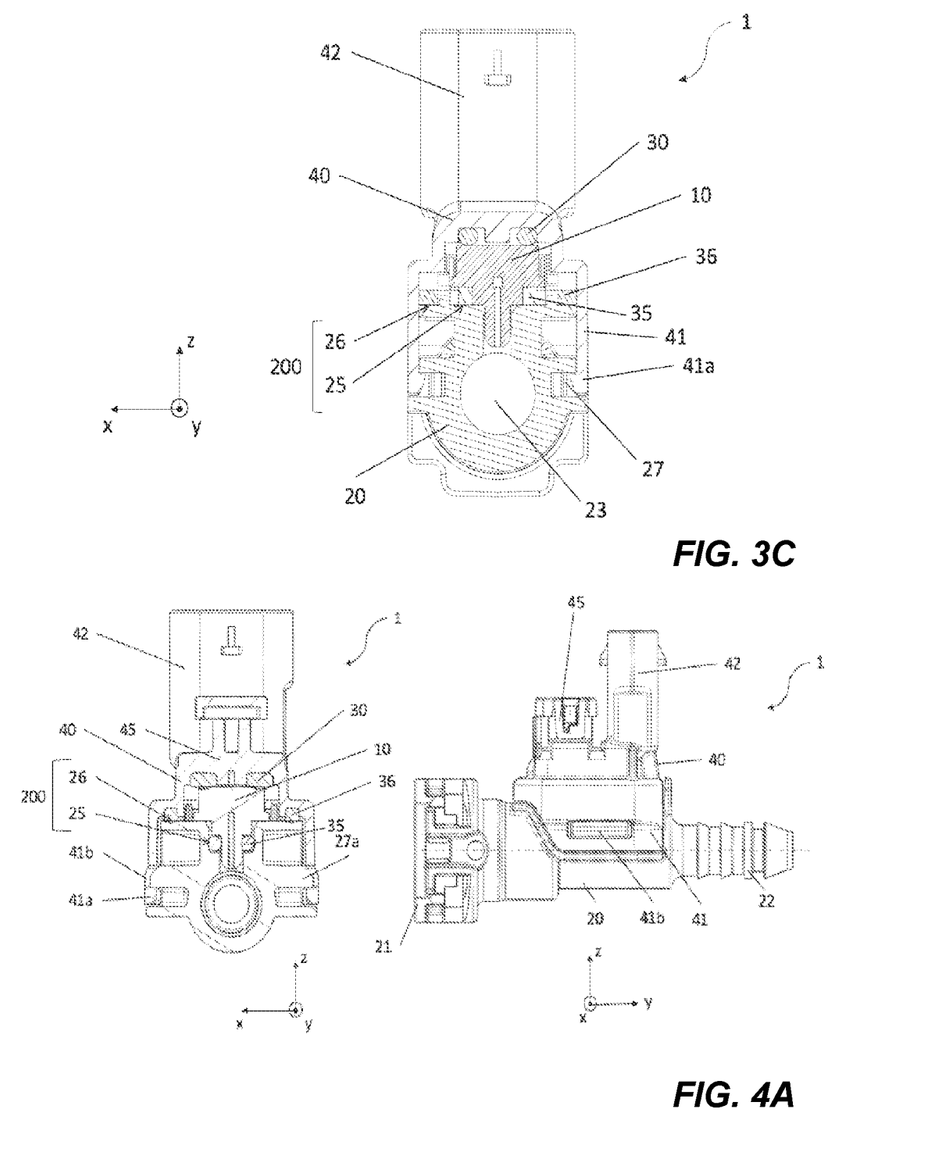
FIGS. 4A-4C show a fluid connector provided with a pressure sensor according to an alternative embodiment of this present disclosure; each figure comprising a view in cross section along a transverse plane (x,z) and a side view in a longitudinal plane (y,z).

According to a third embodiment, shown in FIGS. 3A-3C, the pressure sensor 10 comprises a shoulder, the first gasket 35 being placed against the shoulder; the gasket is compressed by the pressure sensor 10 to provide an axial seal between the internal duct 23 and the outside of the body 20. The seal is provided by axial compression of the gasket 35 against the flat and horizontal surfaces (parallel to the plane (x,y) in the figures) of the first receiving area 25 and of the shoulder of the sensor 10, respectively.

Lastly, returning to the general description of the present disclosure, the fluid connector 1 comprises a cover 40 arranged on the pressure sensor 10. The cover 40 makes contact with the second receiving area 26 through the second gasket 36, to isolate the pressure sensor 10 from the external environment (in particular, humidity, dust, etc.). To do this, the second receiving area 26 completely surrounds the space occupied by the sensor 10 on the body 20, and the cover 40 completely encloses the sensor 10.

Note that in the case of a relative pressure sensor, a ventilation system 45 is fitted in the cover 40, to provide access to the external pressure, as illustrated in FIG. 4A.

The cover 40 further comprises two side wings 41 extending at least in part around the body 20 to cooperate with the attachment regions 27 and to allow the assembly of the cover 40 on the body 20. The configuration of the side wings 41, which allows the cover 40 to overlap the body 20, improves the mechanical stability of the cover 40 on the body 20 and thus the robustness of the connector 1; it also reduces the bulk associated with the integration of the pressure sensor 10 and provides a functional and compact connector 1. In addition, this configuration effectively protects the electronics of the sensor 10 from dust.

Several methods for mounting the cover 40 on the body 20 may be used; for example, the two side wings 41 may be clipped, bonded, or welded to the attachment regions 27.

In the particular case of a clip assembly, each side wing 41 advantageously comprises at least one tooth 41a at its end and each attachment region 27 comprises at least one groove to allow the one to be clipped to the other (FIGS. 1C, 2C, 3C). More advantageously, the tooth 41a of each side wing 41 has a progressive profile and/or each side wing 41 has an inclined edge at its end (FIG. 1D), to allow a progressive resilient deformation of the cover 40 during its assembly onto the body 20 until it is clipped into place.

Figure 4B:
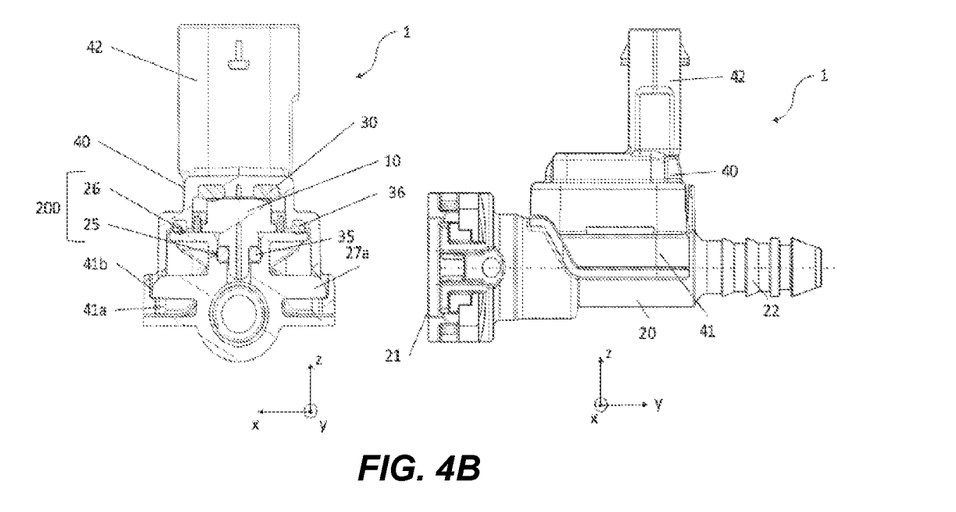
Figure 4C:
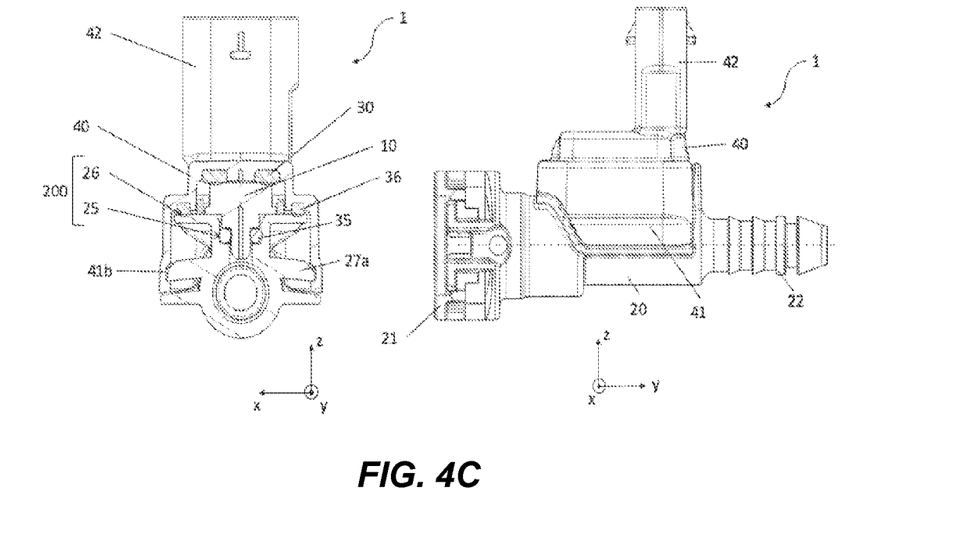

Naturally, each side wing 41 could comprise at least one groove or window 41b (instead of, or in addition to, the tooth 41a) at its end and each attachment region 27 could comprise at least one tooth 27a to allow the one to be clipped to the other; examples of such a variant are shown in FIGS. 4A-4C.

Figure 1D:
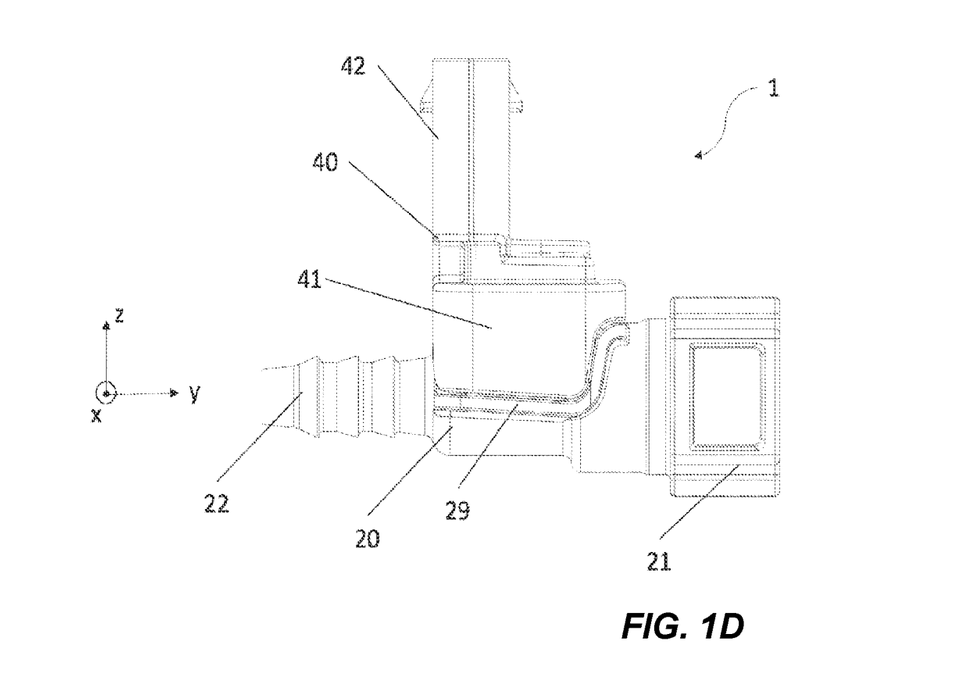
Figure 1E:
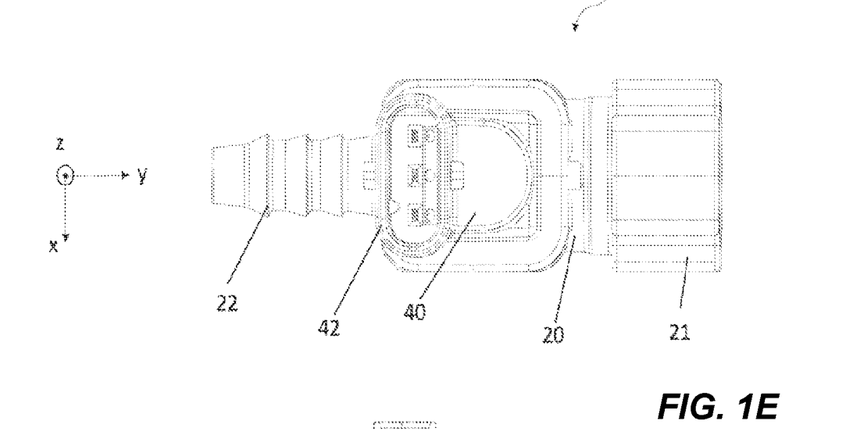

As illustrated in FIG. 1D, the body 20 may advantageously comprise a bead 29 along the edge of the side wings 41 to block access to the attachment region 27 and to prevent the disassembly of the connector 1.

When the assembly is achieved by clipping, the second gasket 36 is advantageously a gasket made of elastomeric material, an O-ring or of another shape suitable for the second receiving area 26. In the example illustrated in FIG. 1E, the second gasket 36 will be substantially square- or rectangular-shaped, identical to the contours of the cover 40 (and of the second receiving area 26, not visible in the figure).

In the case of an assembly by bonding, the end of each side wing 41 may be bonded to an associated attachment region 27. According to another option, all the edges of the cover 40 in contact with the body 20 may be bonded to the body 20 by a continuous peripheral adhesive strip; the second gasket 36 may then comprise or consist of the strip of adhesive material.

In the case of a welded assembly, the end of each side wing 41 may be welded to an associated attachment region 27. According to another option, all the edges of the cover 40 in contact with the body 20 may be welded to the body 20, forming a continuous peripheral weld bead; the second gasket 36 may then comprise or consist of this weld bead.

In the particular case where the body 20 has a region where the diameter at the level of one of the fluid connection end pieces is made narrower, for example, at the level of the end piece 22 as illustrated in FIGS. 1A and 1B, the cover 40 may comprise a transverse wing 44 resting on the narrowed region. This transverse wing 44 reinforces the mechanical stability of the cover 40 on the body 20.

Lastly, the cover 40 of the fluid connector 1 according to the present disclosure comprises an electrical connection end piece 42 for connecting the pressure sensor 10 to the outside. In particular, metal pins 43 connected to the electrical connection terminals 12 of the sensor 10 lead to and extend into the electrical connection end piece 42. The connection between the terminals 12 and the pins 43 may be provided by spring contacts or alternatively by a conductive solder. The spring contacts are particularly advantageous because they make it possible to adjust the positioning of the PCB (of the sensor 10) and of the connecting cylinder 11, which must enter the orifice 24; in general, they relax the dimensioning constraints of the parts and provide better resistance to vibrations and shocks.

The pins 43 may be overmolded or force-fitted in the cover 40. The pins allow the connection of the sensor 10 to an external controller, for example.

According to a variant providing flexibility in mounting and conferring modularity to the fluid connector 1, the cover 40 may have a shape that is symmetrical with respect to a longitudinal plane (y,z) passing through the central axis y of the internal duct 23 and through the center of the orifice 24. The assembly interface 200 is also arranged symmetrically along this same longitudinal plane (y,z). This symmetrical shape allows the assembly formed of the cover 40 and the pressure sensor 10 to be mounted on the body 20 with the electrical connection end piece 42 placed either on the side of the first end piece 21 or on the side of the second end piece 22 of the fluid connector 1.

Note that to facilitate the assembly of the connector 1 it is also possible to provide an assembly interface 200 comprising at least one centering pin 28, to help position the pressure sensor 10 and/or the cover 40 on the body 20 (FIGS. 1A, 2A, 3A).

Advantageously, the fluid connector 1 comprises a resilient element 30 to ensure the mechanical retention of the sensor 10, i.e., to keep it wedged between the cover 40 and the body 20, while compensating for the dimensional variations and mounting clearances during assembly, in particular, by clipping. In particular, the printed circuit board of the pressure sensor 10 may have non-uniform and/or non-reproducible thicknesses from one sensor to another: it is therefore advantageous to have a resilient element 30 to accommodate these tolerances and ensure in any circumstance that the sensor 10 is pressed between the cover 40 and the body 20 at the same time, without altering the calibration of the sensor 10.

The resilient element 30 also provides the advantage of absorbing the potential vibrations transmitted either by the body 20 or by the electrical connection end piece 42 of the cover 40 by acting as a damper. The fluid connector 1 may thus be compact, without requiring reinforcements by adding material, whatever the frequencies of vibration encountered.

Such a resilient element 30 may be arranged between the cover 40 and one face of the pressure sensor 10 (the only contact between the cover 40 and the sensor 10 being established via the resilient element 30), the other face of the sensor 10 being in contact with the body 20, as is illustrated, for example, in FIGS. 1B, 1C, 2B, 2C.

Alternatively, the resilient element may be arranged between one face of the pressure sensor 10 and the body 20 (the only contact between the body 20 and the sensor 10 being established via the resilient element 30), the other face of the sensor 10 being in contact with the cover 40. In the third embodiment illustrated in FIGS. 3A-3C and describing a configuration of the first gasket 35 providing an axial seal, a proposed option is that the first gasket 35 acts as the resilient element, due to its arrangement between the bottom face of the sensor 10 and a surface of the body 20 (the first receiving area 25) parallel to the bottom face. The resilient element 30 illustrated in FIGS. 3A-3C then becomes optional.

By way of example, the resilient element 30 may be made as a spring or of an elastomeric material.

In general, when made as an elastomeric material, the resilient element 30, the first gasket 35, and/or the second gasket 36 may be overmolded on the cover 40 or on the body 20 or fitted against the cover 40 or against the body 20.

Likewise, at least one of these three elements 30, 35, 36 or all three may have a particular annular shape, configured to reduce the compressive forces during the assembly of the cover 40 on the body 20. For example, the annular shape may have a cross section with a thinner central portion, which limits the resistance to crushing of the resilient element 30 and/or of the gaskets 35, 36.

The particular structure of the fluid connector 1 according to this disclosure gives it modularity, robustness, and compactness. In particular, the cooperation between the cover 40 and the assembly interface 200 makes it possible to greatly limit the bulk, while effectively maintaining the pressure sensor 10 and protecting it from the external environment.

It is conceivable for the pressure sensor 10 to be secured (for example, by bonding) to the cover 40 or to the body 20. Note that in the case where it is secured to the body 20, this provides additional security against the risk of leakage of the fluid flowing into the internal duct 23, in the event of accidental removal of the cover 40. In effect, the pressure sensor 10 integral with the body 20 acts as a safety plug due to its cooperation with the first receiving area 25 via the first gasket 35.

Naturally, the present disclosure is not limited to the embodiments and examples that have been described, and it is possible to add alternative embodiments thereto without departing from the scope of the invention as defined by the claims.

The invention claimed is:

1. A fluid connector, comprising:
a body having a generally cylindrical shape, the body having two fluid connection end pieces and defining an internal duct in which a fluid is intended to circulate;
an assembly interface on and in the body, the assembly interface comprising an orifice placing the internal duct in communication with the outside of the body, a first receiving area extending around the orifice, a second receiving area extending around the first receiving area, and attachment regions;
a pressure sensor comprising a connecting cylinder positioned in or facing the orifice, the pressure sensor establishing contact with the first receiving area by way of a first gasket to provide a seal between the internal duct and the outside of the body; and
a cover positioned on the pressure sensor and establishing contact with the second receiving area via a second gasket in order to isolate the pressure sensor from the outside environment, the cover further comprising an electrical connection end piece for connecting the pressure sensor, the cover comprising two side wings extending at least in part around the body, such that the cover overlaps the body, to cooperate with the attachment regions and secure the cover on the body; and
a resilient element positioned between the cover and one face of the pressure sensor, another face of the pressure sensor being in contact with the body, a single contact between the cover and the sensor being established via the resilient element,
wherein the resilient element contributes to mechanical retention of the sensor between the cover and the body.

2. The fluid connector of claim 1, wherein:
the first receiving area comprises a housing coaxial with the orifice; and
the connecting cylinder forms a protuberance that extends into the housing, the first gasket positioned in the housing and around the protuberance to provide a radial seal between the internal duct and the outside of the body.

3. The fluid connector of claim 1, wherein:
the first receiving area comprises a conical widening in continuity with the orifice; and
the pressure sensor has a shoulder, the first gasket positioned in the conical widening and against the shoulder to provide a seal between the internal duct and the outside of the body.

4. The fluid connector of claim 1, wherein the pressure sensor has a shoulder, the first gasket positioned against the shoulder and compressed by the pressure sensor to provide an axial seal between the internal duct and the outside of the body.

5. The fluid connector of claim 1, wherein the first and/or the second gasket have/has an annular shape configured to reduce compressive forces during assembly of the cover on the body.

6. The fluid connector of claim 5, wherein the annular shape of the first and/or the second gasket has a cross section with a thinned central portion.

7. The fluid connector of claim 1, wherein the two side wings are clipped to the attachment regions.

8. The fluid connector of claim 7, wherein each side wing has an end including at least one tooth, and each attachment region has at least one groove configured to receive the at least one tooth therein when the two side wings are clipped onto the attachment regions.

9. The fluid connector of claim 8, wherein the at least one tooth of each side wing has a progressive profile and/or each side wing has an inclined edge at its end, to allow the progressive clipping of the cover onto the body.

10. The fluid connector of claim 1, wherein the two side wings are bonded or welded to the attachment regions.

11. The fluid connector of claim 10, wherein the second gasket comprises a strip of adhesive material when the two side wings are bonded to the attachment regions, or a weld bead when the two side wings are welded to the attachment regions.

12. The fluid connector of claim 1, wherein the cover and the assembly interface have a symmetrical shape with respect to a longitudinal plane passing through a central axis of the internal duct and through a center of the orifice.

13. The fluid connector of claim 1, wherein the body has a region with a narrowing diameter at one of the fluid connection end pieces, and wherein the cover comprises a transverse wing resting on the narrowing region.

14. The fluid connector of claim 1, wherein the pressure sensor comprises electrical connection terminals connected to pins leading into the electrical connection end piece.

15. The fluid connector of claim 14, wherein the pins are overmolded or force-fitted in the cover.

16. The fluid connector of claim 14, further comprising spring contacts between the electrical connection terminals and the pins.

17. The fluid connector of claim 1, wherein the resilient element comprises a spring or an elastomeric member.

18. The fluid connector of claim 1, wherein the resilient element is overmolded on the cover or on the body or is fitted against the cover or against the body.

19. The fluid connector of claim 1, wherein the pressure sensor is secured to the cover or to the body.

* * * * *

UNITED STATES PATENT AND TRADEMARK OFFICE
CERTIFICATE OF CORRECTION

PATENT NO. : 12,264,768 B2  
APPLICATION NO. : 17/995653  
DATED : April 1, 2025  
INVENTOR(S) : Mansour Mbaye and Emile Ferrand Page 1 of 1

It is certified that error appears in the above-identified patent and that said Letters Patent is hereby corrected as shown below:

In the Claims

Claim 1, Column 8, Line 22, change "of the body; and" to --of the body;--

Signed and Sealed this  
Second Day of September, 2025

Coke Morgan Stewart  
*Acting Director of the United States Patent and Trademark Office*